United States Patent

Courtright, II et al.

[11] Patent Number: 6,105,103
[45] Date of Patent: Aug. 15, 2000

[54] METHOD FOR MAPPING IN DYNAMICALLY ADDRESSED STORAGE SUBSYSTEMS

[75] Inventors: William V. Courtright, II; William P. Delaney, both of Wichita, Kans.

[73] Assignee: LSI Logic Corporation, Milpitas, Calif.

[21] Appl. No.: 08/995,213

[22] Filed: Dec. 19, 1997

[51] Int. Cl.[7] .................................................. G06F 17/30
[52] U.S. Cl. .............................. 711/1; 707/205; 707/202; 711/113; 711/6; 711/4; 711/114
[58] Field of Search .......................... 711/114, 111, 112, 711/113, 1, 4, 6; 707/205, 202, 200

[56] References Cited

U.S. PATENT DOCUMENTS

| | | | |
|---|---|---|---|
| 5,193,184 | 3/1993 | Belsan et al. | 711/114 |
| 5,297,258 | 3/1994 | Hale et al. | 711/114 |
| 5,379,391 | 1/1995 | Belsan et al. | 711/114 |
| 5,408,644 | 4/1995 | Schneider et al. | 395/575 |
| 5,410,667 | 4/1995 | Belsan et al. | 711/114 |
| 5,416,915 | 5/1995 | Mattson et al. | 711/114 |
| 5,418,925 | 5/1995 | DeMoss et al. | 711/114 |
| 5,432,922 | 7/1995 | Polyzois et al. | 364/DIG. 1 |
| 5,440,716 | 8/1995 | Schultz et al. | 711/114 |
| 5,488,701 | 1/1996 | Brady et al. | 714/710 |
| 5,519,849 | 5/1996 | Malan | 395/500 |
| 5,530,850 | 6/1996 | Ford et al. | 707/206 |
| 5,530,948 | 6/1996 | Islam | 711/114 |
| 5,542,065 | 7/1996 | Burkes et al. | 711/114 |
| 5,551,003 | 8/1996 | Mattson et al. | 711/136 |
| 5,557,770 | 9/1996 | Bhide et al. | 711/161 |
| 5,581,724 | 12/1996 | Belsan et al. | 711/114 |
| 5,581,736 | 12/1996 | Smith | 711/170 |
| 5,870,763 | 2/1999 | Lomet | 707/202 |

*Primary Examiner*—Anton W. Fetting
*Assistant Examiner*—Greta L. Robinson

[57] ABSTRACT

A paged addressing method and associated apparatus for dynamically addressed disk storage subsystem. The present invention stores the logical to physical address map in the disk array. The logical to physical address map is divided into useful sized portions. The logical to physical address map portions containing the most recently used logical to physical address information are retained in cache. Paging techniques are used to swap the logical to physical address map portions from disk to cache when a host disk access requires a logical address not currently within the mapping information in local memory (e.g., cache). The present invention keeps track of the most recently used logical to physical address map portions in cache by defining a cache map. Furthermore, a directory resides in cache that keeps track of the physical address for each logical to physical address map portion. The present invention reduces memory requirements, because the memory map of the disk array is not stored within cache. Instead, information is demand-fetched as required. The present invention also provides for quick recovery of the logical to physical address map directory in cache in response to a cache failure during restart procedures.

23 Claims, 5 Drawing Sheets

FIG. 3

LDMC DIRECTORY

| LDMC # | PHYSICAL ADDRESS | IN CACHE | LOCATION IN CACHE |
|---|---|---|---|
| 0 | 1001 | 1 | 10 |
| 1 | 2001 | 0 | |
| 3 | 3001 | 1 | 20 |
| 4 | 4001 | 0 | |
| ⋮ | ⋮ | ⋮ | ⋮ |

METHOD FOR MAPPING IN DYNAMICALLY ADDRESSED STORAGE SUBSYSTEMS

BACKGROUND OF THE INVENTION

1. Field of the Invention

The present invention relates to the field of storage subsystem control and in particular to paging techniques applied to mapping in dynamically addressed virtual storage subsystems.

2. Discussion of Related Art

Typically, a computer stores data within devices such as hard disk drives, floppy drives, tape, compact disk, etc. These devices are otherwise known as storage devices. If a large amount of data requires storage, then a multiple of these devices are connected to the computer and utilized to store the data. A computer typically does not require knowledge of the number of storage devices that are being utilized to store the data because another device, the controller, is utilized to control the transfer of data to and from the computer to the storage devices. The software within the controller may be sophisticated to configure the storage devices to appear as one large "virtual" storage device to the computer. For example, three one megabyte hard disk drives can appear to the computer as one three megabyte virtual storage device. Similarly a plurality of disk drives, or a mix of storage devices such as a floppy disk, disk drive, solid state disk, or tape, can appear to the host as a single virtual storage device. The controller and the storage devices are typically called a storage subsystem and the computer is usually called the host because the computer initiates the requests for data from the storage devices.

Furthermore in a virtual storage device, the amount of physical storage can increase by adding storage devices to the storage subsystem. The host, however, continues to be unaware the storage subsystem comprises various storage devices or the amount of physical space available on each storage device. The host is, however, interested in the additional logical space available for its use.

Once data is stored within a storage device, the computer does not know the actual physical location of the data. Instead, the computer relies upon the controller to keep track of the physical location, that is, address of the data within the storage devices. The computer prefers to use virtual or "logical" addresses to determine the location of the data within the virtual storage device. These logical addresses are mapped, or translated into the actual physical addresses of the data within the storage device.

As previously stated, the storage subsystem controller, within the storage subsystem, manages the transfer of data within the storage devices in the storage subsystem as well as the mapping from host supplied virtual or logical addresses to physical storage locations. As taught in the art, the storage subsystem controller maintains an "in-core" map or look-up table in the storage subsystem controller, translating host logical addresses to physical storage.

A log structured storage system is one type of mapped virtual storage subsystem. In a log structured storage system, blocks of information within the storage system are represented as a log structure. These blocks are updated by appending the modified blocks to the log. As blocks of information are updated (e.g. modified), the modified blocks and information regarding the physical location of the modified blocks within the storage subsystem are appended to the log in a sequential order. Unlike other virtual storage systems, the storage subsystem controller determines the physical locations that are mechanically or electronically convenient, rather than locations that may be computationally derived from the logical address used by the host.

A log structured storage system improves write performance of the disk storage subsystem due to the reduction in write operations. Write requests tend to be random or scattered across a storage subsystem. The log structured storage system coalesces such scattered write requests into a single larger write request thereby eliminating multiple write operations to the disk array.

A segment buffer is an area in cache utilized to accumulate (e.g. coalesce) the write requests. Each write request is appended in sequential order to the last block within the segment buffer. The segment buffer allows the modified data blocks to be posted to disk as a single write operation when the segment buffer is full. The storage subsystem controller keeps track of the physical addresses of the blocks of information in an "in-core" map that locates the physical address associated with each logical address.

Since every host access to logical addresses in the storage subsystem requires the virtual storage subsystem to reference the in-core map, subsystem performance may be impacted by overhead processing to access the map to translate virtual (logical) addresses to physical addresses in the subsystem. Typically, the in-core map is located within cache or high-speed memory (e.g. high-speed cache) on the storage controller to improve access to the map. Storing the entire map in cache, however, requires an inordinate amount of relatively expensive cache memory. For example, if a disk array or logical unit has a capacity of 100 gbytes and a block size of 1 kbytes, the directory requires 100 gbytes 1 kbyte or 100 M entries. Assuming further that the directory occupies 32 bits for each entry, then 400 Mbytes of cache are required for the directory. This amount of cache is not only expensive but requires a large amount of physical space that may not be available within the controller.

From the above discussion, it is evident that a need exists to provide methods and associated apparatus for reducing the size of memory requirements to store a virtual to physical map in a virtually mapped storage subsystem while maintaining acceptable performance levels in the subsystem.

SUMMARY OF THE INVENTION

This present invention solves the above and other problems, thereby advancing the useful arts, by storing the logical address to physical address map on the physical storage subsystem (e.g., disk array) and using paging techniques to maintain recently used map information in high-speed memory of the storage subsystem controller. The virtual to physical map is referred to as the logical disk map (LDM). Useful sized portions (chunks) of the LDM (also referred to herein as LDMC) are maintained in high-speed volatile memory (herein referred to as the LDMC cache). A top-level directory referred to as the LDMC directory is also maintained within the LDMC cache or in a separate cache area to identify the physical address of the LDMC within the disk array.

By storing only portions of the LDM within the LDMC cache, the present invention drastically reduces memory storage requirements as compared to known techniques, because the entire LDM is no longer stored within cache or high-speed cache. Instead, information is demand-fetched as required. Thus the present invention reduces the amount of memory storage required to store a logical address to physical address map and therefore reduces the memory storage costs.

However, certain applications will execute more efficiently if a pertinent portion of the LDM is continuously stored within the LDMC and not swapped while the application is executing. Thus, a significant number of LDMCs maybe required in cache so that the cache size versus the rate of swaps from the storage subsystem to cache is tolerable.

Some factors determining the size of an LDMC is the hit ratio versus page fault and the number of swaps that can be tolerated. These factors help determine the useful number of entries that may be frequently accessed together and therefore the size of the LDMC portion. Regardless, the present invention continues to drastically reduce memory consumption because only a relatively small portion of the LDM continuously remains within cache while the application is executing and the rest of the LDM remains within the disk array.

The LDMC cache may be implemented within the storage controller's existing high-speed cache memory or may be implemented as a dedicated high-speed cache used exclusively for mapping purposes. A map, referred to as the LDMC cache map, is maintained within the LDMC cache to identify which LDMC are present in the LDMC cache and the location in cache. By maintaining the LDMC cache map, the present invention can quickly scan the LDMC cache map, which is a small amount of information, rather than scanning the LDMC cache. A person skilled in the art will recognize the LDMC directory can contain extra bits to indicate whether a particular LDMC is presently available in cache and where the particular LDMC resides in cache, thereby eliminating the LDMC cache map.

A person skilled in the art will recognize, the LDM may be scattered over several disk drives of the disk array or may be stored within one disk drive of the disk array.

Using the logical address received from the host request, the mapping procedures of the present invention determines using integer division which LDMC contains the particular LDM entry required to map the host supplied logical address to a present physical address. In the present invention, the logical address requested by the host is divided by the size of LDMC. For example, if the host I/O requested logical address 35, then a fixed sized LDMC using 10 LDM entries per LDMC would result in logical address 35 found within LDMC #3.

Once the requisite LDMC is identified, the LDMC cache map is queried to determine if the requisite LDMC is present in the LDMC cache and the location in cache. If the LDMC is present in cache, the logical to physical mapping is performed and the data on the disk array is manipulated in accordance with the host I/O request.

Otherwise, the LDMC must be retrieved from the LDM stored in the disk array. The LDMC directory is searched to determine the physical address of the required LDMC. The requisite LDMC is read from the disk array into an available LDMC position in the LDMC cache. The LDMC directory identifies the physical location on the disk array where the requisite LDMC is stored. If no position is presently available in the LDMC cache, an LDMC in the LDMC cache is selected and written back to the LDM thereby freeing the associated slot in the LDMC cache. After the swap, the LDMC cache map is updated. Modified LDMCs are posted to disk along with other coalesced write requests.

For example, if there are no free slots in the LDMC cache, then an unmodified LDMC can be swapped for the required LDMC. LDMCs remain unmodified if the storage subsystem controller does not change the physical address for the particular user's data block. If there are no unmodified LDMC whose LDMC cache slot can be reused, or the storage subsystem controller cache management determines to retain unmodified LDMC in the LDMC cache, then a modified LDMC is flushed to nonvolatile storage and its associated slot in the LDMC cache is reused for the required LDMC.

Techniques for selecting the LDMC to be removed from the LDMC cache, such as, page replacement policies and methods are well known in the art and described in many texts on virtual memory or paging subsystems. See, for example, Andrew S. Tanenbaum, Structured Computer Organization 318–391 (Prentice-Hall, Inc. 1990). These replacement policies may include first-in-first-out (FIFO), least recently used (LRU), or a hybrid algorithm to determine which LDMC to swap from the LDMC cache in order to free space for the LDMC retrieved from the LDM.

Algorithms for searching the LDMC cache map or the LDMC directory for a particular LDMC are well known in the art and described in texts on sorting and searching algorithms. See, for example, Donald E. Knuth, 3 The Art of Computer Programming (Addison-Wesley Publishing, Co. 1973). A person skilled in the art will recognize that the LDMC cache map or the LDMC directory can be searched using a simple sequential search, a hierarchical search using a binary search, or other searching algorithms. Additionally, it should be noted that the LDMC cache map does not need to be an ordered list directory as described. Rather the LDMC cache map can be implemented as a hash table with hash computations operable to locate an LDMC in the LDMC cache. Depending upon the application and design requirements, the LDMC directory can be implemented as a hash table if there were large amounts of logical addresses not currently utilized. Thereby further reducing the size of the LDMC directory in cache.

Following a power failure or crash of the LDMC cache memory, the LDMC directory may need to be restored. Faster recovery of the LDMC and LDMC directory within cache is possible because both are smaller than the LDM stored on disk. Periodically, a dump, or checkpoint of the area in LDMC cache is performed and stored in nonvolatile memory. Additional information is stored, in nonvolatile memory, regarding the last modified LMDC entry that was posted to disk prior to the last checkpoint. The recovery procedure initializes only the section of cache containing the LDMC because as data is required it will be demand-loaded by the recovery procedure. The checkpoint image is used as a starting point to recreate the LDMC directory. As the LDMC are written to disk, the LDMC directory is updated.

To update the LDMC cache, the recovery procedure scans the segments on disk modified after the latest checkpoint of the LDMC cache. The recovery procedure updates the LDMC entries in the LDMC cache if the physical address of the LDMC in cache varies from the physical address of the user data blocks on the segments. Additionally, the recovery procedure scans another area of nonvolatile memory containing LDMC entries and user data blocks not yet posted to the disk array. If the physical address of the user data block not yet posted to the disk array is different than the LDMC entries, then the recovery procedure modifies the LDMC entries in the LDMC cache.

A person skilled in the art will recognize an alternative fault tolerant design. A portion of the cache or the entire cache memory storing the LDMC directory, LDMCs, and modified data within the segment buffer may be battery-backed in order to make the cache memory essentially non-volatile with respect to power failures or reset cycles.

Thus ensuring the data stored in the cache memory is not lost if there is a power failure or a reset.

It is therefore an object of the present invention to provide fault tolerant apparatus and associated methods of operation for reducing memory requirements in a virtual storage subsystem controller by storing the logical to physical address map in the disk array and using paging techniques to maintain recently used map information in memory.

It is a further object of the present invention to provide fault tolerant apparatus and associated methods of operation for reducing memory requirements in a virtual storage subsystem controller by storing the recently used logical to physical address map information in memory.

It is another further object of the present invention to provide fault tolerant apparatus and associated methods of operation for reducing the time required for reconstructing the directory of recently used map information in memory following a power failure or crash of memory.

It is a yet a further object of the present invention to provide fault tolerant apparatus and associated methods of operation for reducing fast memory requirements in a virtual storage subsystem controller by storing the recently used and frequently used logical to physical address map information in memory.

It is still yet a further object of the present invention to provide fault tolerant apparatus and associated methods of operation for storing the logical to physical address map within different areas of the disk array.

The above and other objects, aspects, features, and advantages of the present invention will become apparent from the following description and the attached drawings.

BRIEF DESCRIPTION OF DRAWINGS

FIG. 3 is a block diagram of the LDMC directory also useful for keeping track of LDMC in cache.

DETAILED DESCRIPTION

Figure 1:
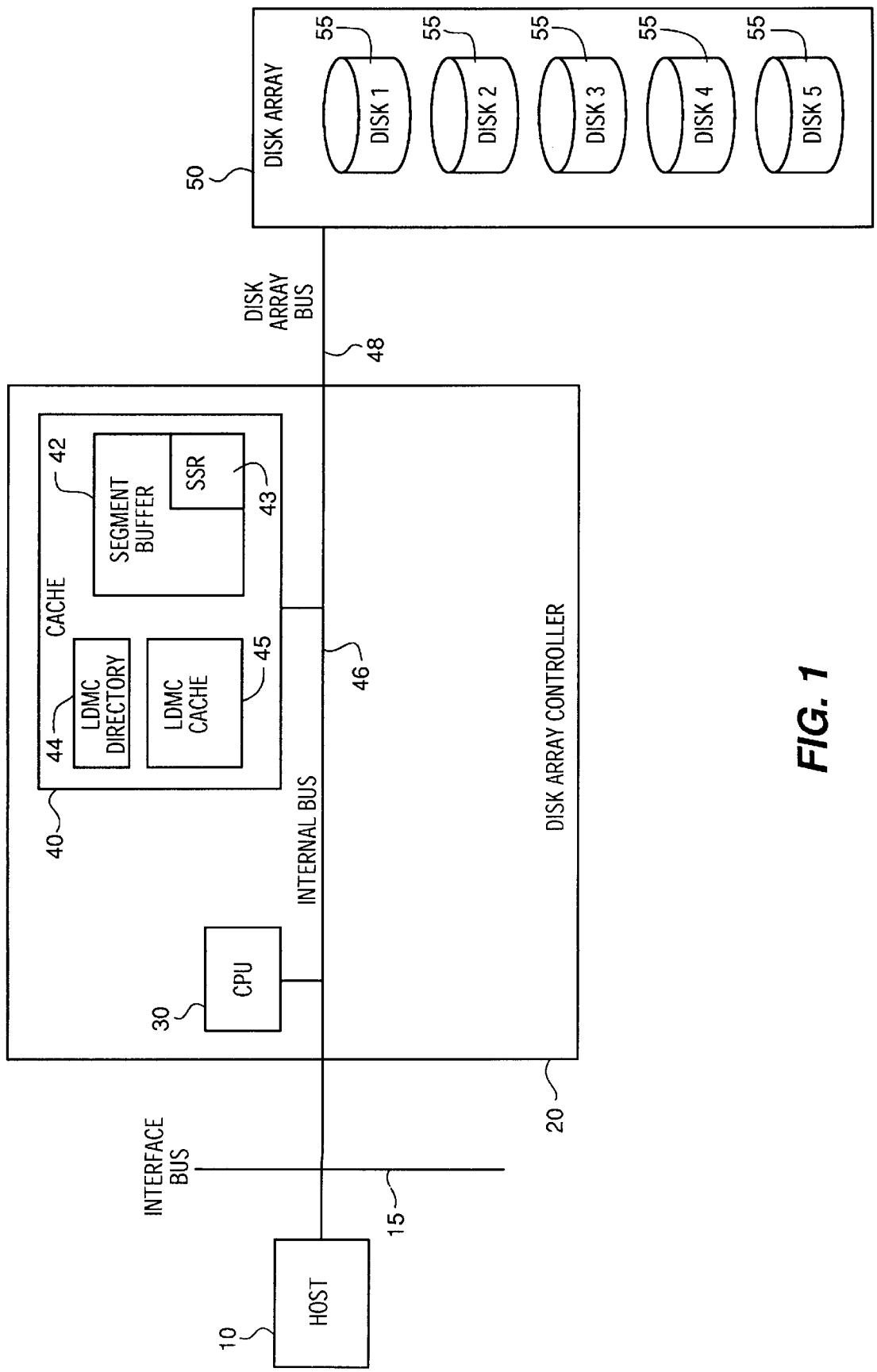
FIG. 1 is a block diagram of a typical storage subsystem in which the methods of the present invention is advantageously applicable.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical disk storage subsystem 50, having a disk array controller 20, in which the methods and associated apparatus of the present invention may be applied. Disk array controller 20 is in turn connected to disk array 50 via bus 48 and to host computer 10 via interface bus 15. Disk array 50 is comprised of a plurality of disk drives 55. One of ordinary skill in the art will readily recognize that disk array bus 48 between disk array controller 20 and disk array 50 (including disk drives 110) may be any of several industry standard interface busses including SCSI, IDE, EIDE, IPI, Fiber Channel, SSA, PCI, etc. Circuits (not shown) within the disk array controller 20 appropriate to controlling bus 48 are well known to those of ordinary skill in the art.

Interface bus 15 between disk array controller 20 and host computer 10 may be any of several standard industry interface busses including SCSI, Ethernet (LAN), Token Ring (LAN), Fibre Channel, etc. Circuits (not shown) within disk array controller 20 appropriate to controlling bus 15 are well known to those of ordinary skill in the art.

Disk array controller 20 includes CPU 30 and local memory (e.g. cache memory) 40 for storing data and control information related to the data stored in disk array 50. CPU 30 and cache memory 40 are connected via internal bus 46 to enable CPU 30 to store and retrieve information in the memory devices. The data structures of the present invention are embodied within cache memory 40 and are created and manipulated by methods operable within 30. A person skilled in the art will recognize the cache memory 40 can include different types of cache memory such as SRAM or DRAM. Furthermore, a portion or the entire cache memory 40 can be battery-backed and therefore essentially non-volatile with respect to a power or reset cycle. Thus ensuring the data stored in the cache memory is not lost if there is a power failure.

Cache memory 40 includes LDMC cache memory 45, LDMC directory 44, and segment buffer 42. LDMC cache memory 45 contains recently used and frequently used portions of the logical to physical map stored in disk array 50. The LDMC directory 44 contains the LDMC directory.

In log structured storage systems, a segment buffer 42 is used to accumulate modified data blocks so that modified data blocks may be written with a single I/O operation. Each write request is appended in sequential order to the last block within the segment buffer 42. When segment buffer 42 fills, data in segment buffer 42 is posted to disk array 50. The end of each segment buffer 42, and therefore each segment written to disk array 50, contains control information that is required for crash recovery. The control information is reserved in an area of the segment buffer 42 called the segment summary region (SSR) 43. The SSR 43 includes the index number of the segment that logically precedes the current segment being written to disk, the index number of the segment that logically follows the current segment being written to disk, and a table that contains the logical address for each user data block present in the segment buffer 42. The segment buffer 42 resides in a battery-backed portion of cache memory 40 and is essentially non-volatile to avoid loss of data during power interruptions or reset conditions.

One of ordinary skill in the art will readily recognize that the block diagram of FIG. 1 is intended only as an exemplary design, which may embody the present invention. Many controller and subsystem designs may embody the methods and associated apparatus and structures of the present invention.

Figure 2A:
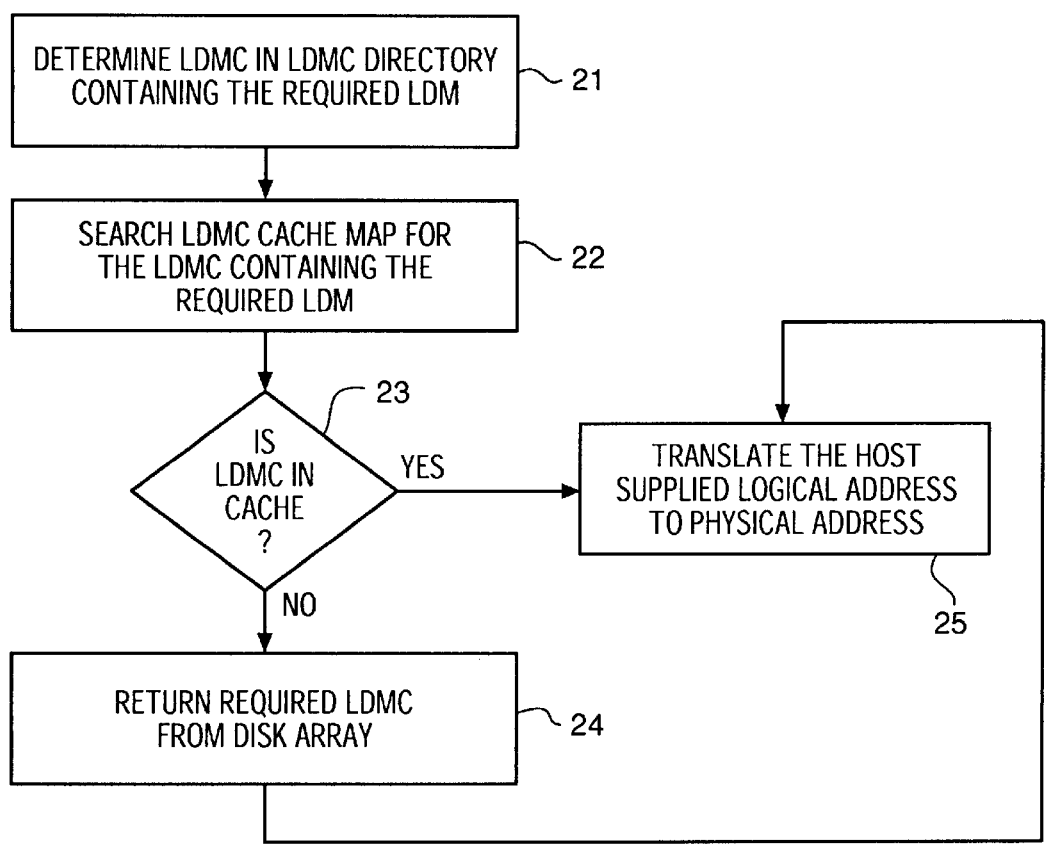
FIG. 2a is a flow diagram of the method for performing a translation of a logical to physical address.

FIG. 2a is exemplary of the method to translate a logical to physical address using the present invention. First, the LDMC containing the required LDM is computed 21. Once the value is determined, the LDMC cache map, within the LDMC cache, is searched to find the computed LDMC containing the required LDM 22. If the LDMC is in cache 23, then the required LDM is in cache. Once the required LDM is found in cache, the host supplied logical address is translated to its physical address 25. If the LDMC is not in cache 23, then the required LDMC is searched in the LDMC directory 70 to determine the physical address of the LDMC. The LDMC is retrieved from the disk array 24 and the required translation from the logical to physical address is performed 25. The LDMC directory contains the physical address of the computed LDMC.

Figure 2B:
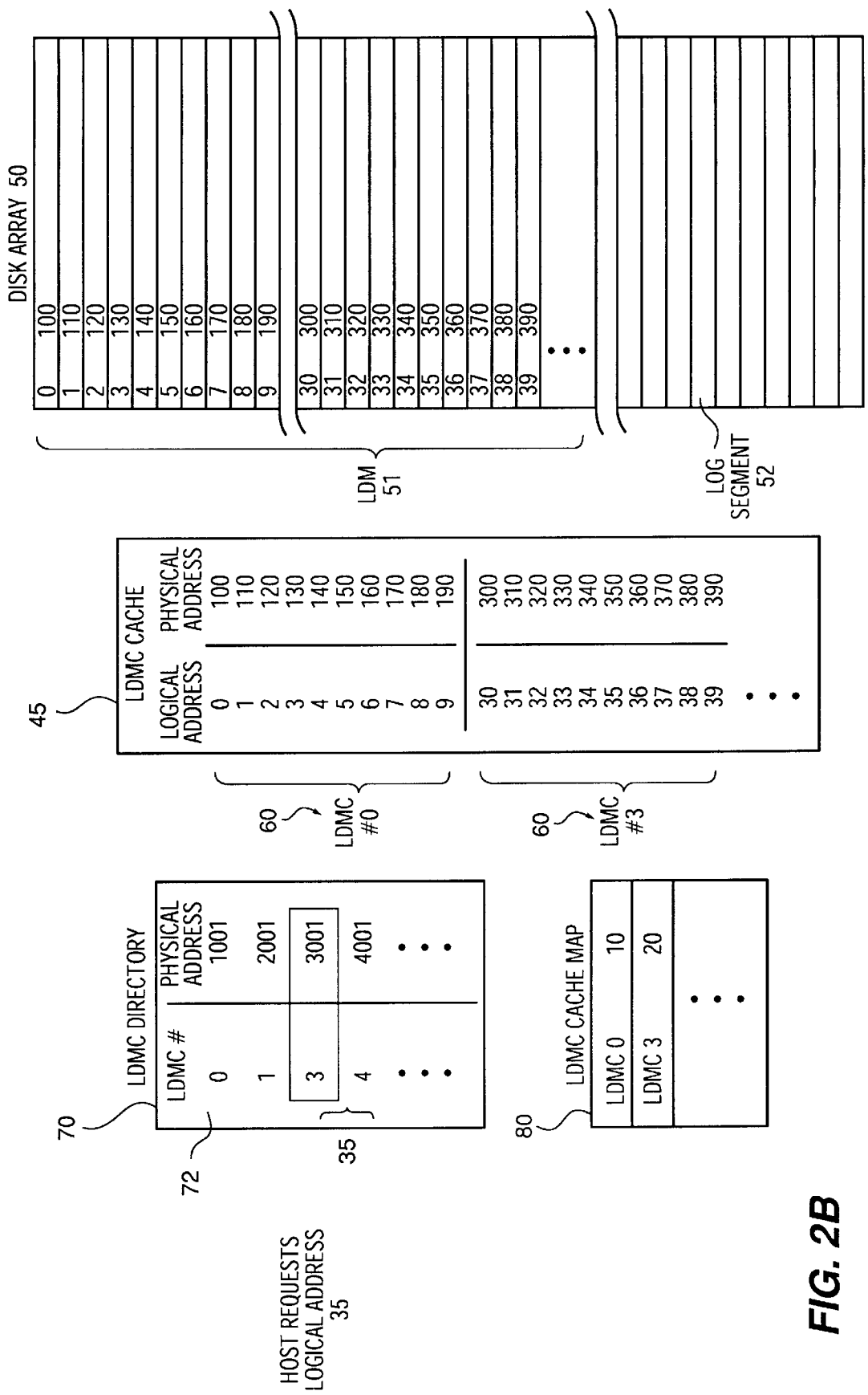
FIG. 2b is a diagram showing the LDMC directory, LDMC cache map, LDMC cache, and LDM within the disk array.

FIG. 2b is exemplary of the data structures used to execute the method as described in FIG. 2a. Disk array 50 stores the logical disk map (LDM) 51. There is no fixed location on the disks 55 for storing the LDM 51. The LDM 51 may be scattered throughout one or more disks 55, or may be striped, as in RAID level 2, 3, 4, 5 or 6 across two or more disks 55.

For example, RAID levels 3, 4, 5 and 6 distribute data across the disks in the array and provide for a block (or multiple blocks) of redundancy information (e.g., parity) that is also distributed over the disk drives. On each disk, data is stored in predefined blocks generally having fixed size. A predefined number of blocks of data and redundancy information (e.g., parity), from each disk of the array, are mapped to define a stripe of data. In RAID level 3, and 4, the redundant information, that is parity information, is stored in a dedicated parity disk. In a RAID level 5 implementation, the parity information is interleaved across all the disks in the array as a part of the stripe. In a RAID level 6, there are two independent computations of parity and both parity computations are stored on separate disks. A person skilled in the art will recognize these are just several techniques operable to store the LDM 51 to disk and other techniques can be utilized to store the LDM 51 to disk.

The LDM 51 contains the logical to physical address translation for the disk array 50 (FIG. 1). The present invention drastically reduces the amount of memory used to store the logical to physical address map and therefore reduces associated memory costs by storing the LDM 51 within disk array 50 rather than maintaining the LDM 51 in cache 40. A person skilled in the art, however, will recognize certain applications will execute more efficiently if a portion of the LDM is continuously stored within the LDMC and not swapped until the application is complete. Regardless, the present invention continues to drastically reduce the amount of memory used to store the logical to physical address map because a significant portion of the LDM is stored within the disk array 50 rather than within cache 40.

The present invention provides the means to keep the LDM 51 in disk array 50 by dividing the LDM 51 into fixed sized portions, or "chunks" referred to as LDMCs 60. For example if each LDMC 60 contains ten LDM 51 entries, LDMC #0 60 can contain physical addresses associated with logical address zero through nine. Similarly, LDMC #3 60 contains physical addresses associated with logical address thirty through thirty-nine.

LDMC cache 45 contains the recently and frequently used LDMCs 60. Since sequential host accesses tend to share a locality of reference, one portion of the LDMC 60 usually suffices to locate a plurality of sequential host accesses. If the LDMC cache 45 were too small, this would probably result in excessive thrashing due to the large amount of swaps required to retrieve the appropriate LDMC 60 from disk array 50. A larger LDMC cache 45 would reduce the amount of thrashing, but the proper size of the LDMC cache 45 may have to be tuned to optimize the cache size versus the rate of finding the appropriate LDMC 60 in the LDMC cache 45. One skilled in the art will recognize the size of the LDMC 60 can be revised depending upon design requirements and desired efficiency results.

The LDMC directory 70 preferably resides in LDMC directory 44, but can reside in LDMC cache 45, or in another area within cache 40. As shown in FIG. 2, the LDMC directory 70 is a top-level directory which includes the LDMC# of an LDMC and its physical address within the disk array 50. Once the LDMC 60 containing the required LDM is determined, the LDMC directory 70 is utilized to determine the physical address of the requisite LDMC 60 within the disk array 50.

The following is an example showing one method to determine which LDMC 60 contains the required LDM for the logical address requested by the host disk access. For example, if the host I/O requested logical address thirty-five, then a fixed sized LDMC 60 using ten LDM entries per LDMC would result in logical address thirty-five found within LDMC #3 60. Mathematically, this can be expressed as follows:

(logical address requested) divided by (size of LDMC)=LDMC # (1);

Thus using the values of the previous example and eq. (1), the following equation is obtained:

(logical address 35) divided (10)=LDMC #3.

Thus for a host I/O requesting logical address thirty-five, the LDMC directory would show logical address thirty-five resides in LDMC#3. The required physical location of logical address thirty-five can be found within LDMC #3. One skilled in the art will recognize the size of an LDMC 60 and the number of LDMCs 60 to maintain in cache can be optimized to reduce the size of the LDMC cache 45 and the number of swaps to disk.

To keep track of the LDMC 60 within LDMC cache 45, the present invention uses a map known as the LDMC cache map 80. The LDMC cache map 80 includes the LDMC # 72 of the LDMC 60 currently residing within the LDMC cache 45. The LDMC cache map 80 is scanned to determine whether the required LDMC 60 is present in LDMC cache 45 and its location within cache. The LDMC cache map 45 is updated whenever an LDMC 60 is swapped from the LDMC cache 45. By maintaining the LDMC cache map 80, the present invention can quickly scan the LDMC cache map, which is a small amount of information, rather than scanning the LDMC cache.

A person skilled in the art will recognize there are many techniques to scan and search the contents of the LDMC cache map 80 or the LDMC directory 70. An optimal search technique can reduce the time required during the search.

For example, a linear sequential search can be performed to search the LDMC cache map 80 and the LDMC directory 70. A counter is initialized and incremented while each LDMC # 72 within the map is compared for the particular LDMC 60. This search is continued until the particular LDMC # 72 is found within the map or until the end of the map is reached.

During the linear search of the LDMC directory 70, if the LDMC directory 70 contains LDMCs 60 that are not currently used, that is, no user data is stored within these logical addresses then the searching technique can take advantage of this fact and skip over these unused LDMCs 60. This is otherwise known as compacting, so that the unused LDMCs 60 in the LDMC directory 70 are skipped.

To further reduce the time required for searching the LDMC directory 70 or the LDMC cache map 80, both map 80 and directory 70 are maintained in a linear ascending order of LDMC # 72 so that the entire map 80 or directory 70 does not need to be searched. In this case, the search eliminates sections of map 80, or directory 70 containing LDMC #'s 72 less than the required LDMC 60, and greater than the required LDMC 60. A person skilled in the art will recognize techniques making use of this basic concept are known as a binary searches or logarithmic searches. Binary searches may not reduce overhead processing, however, the binary search does take advantage of the ordered map and will reduce the time required to search LDMC cache map 80 and the LDMC directory 70.

A person skilled in the art will recognize another technique operable to reduce the time allotted for searching is the use of hashing. The LDMC cache map 80 does not need to be an order list directory as described. Rather the LDMC cache map 80 can be implemented as a hash table with hash computations operable to locate an LDMC 60 in the LDMC cache map 80. Hashing, however, requires computing a function to find the required LDMC 60, and requires a procedure to resolve collisions in the event the function computes duplicate locations for the required LDMC 60. Other well-known searching techniques can be found in Donald E. Knuth, 3 The Art of Computer Programming (Addison-Wesley Publishing, Co. 1973).

Though the above discussed embodiment represents the best presently known mode of practicing the present invention, those skilled in the art will recognize equivalent embodiments of the present invention wherein the LDMC cache map 80 can be incorporated into the LDMC directory 70 to further reduce overhead processing. For example as shown in FIG. 3, the LDMC directory 71 includes extra bits indicating whether an LDMC # 72 is currently within cache and its location in LDMC cache 45. These bits are updated whenever an LDMC is copied to the LDMC cache 45. By including this information within the LDMC directory 71, this embodiment eliminates the need for an LDMC cache map 80. In this embodiment, the LDMC containing the required logical to physical address translation is determined using eq. (1), then the LDMC directory 71 is scanned to determine whether the LDMC 60 is located within cache. If the LDMC 60 is not within the LDMC cache 45, the physical address of the LDMC 60 is read from the LDMC directory 71 and the LDMC 60 is retrieved from the disk array 50. A person skilled in the art will recognize the previously discussed searching techniques are operable with this modified LDMC directory 71.

Figure 4:
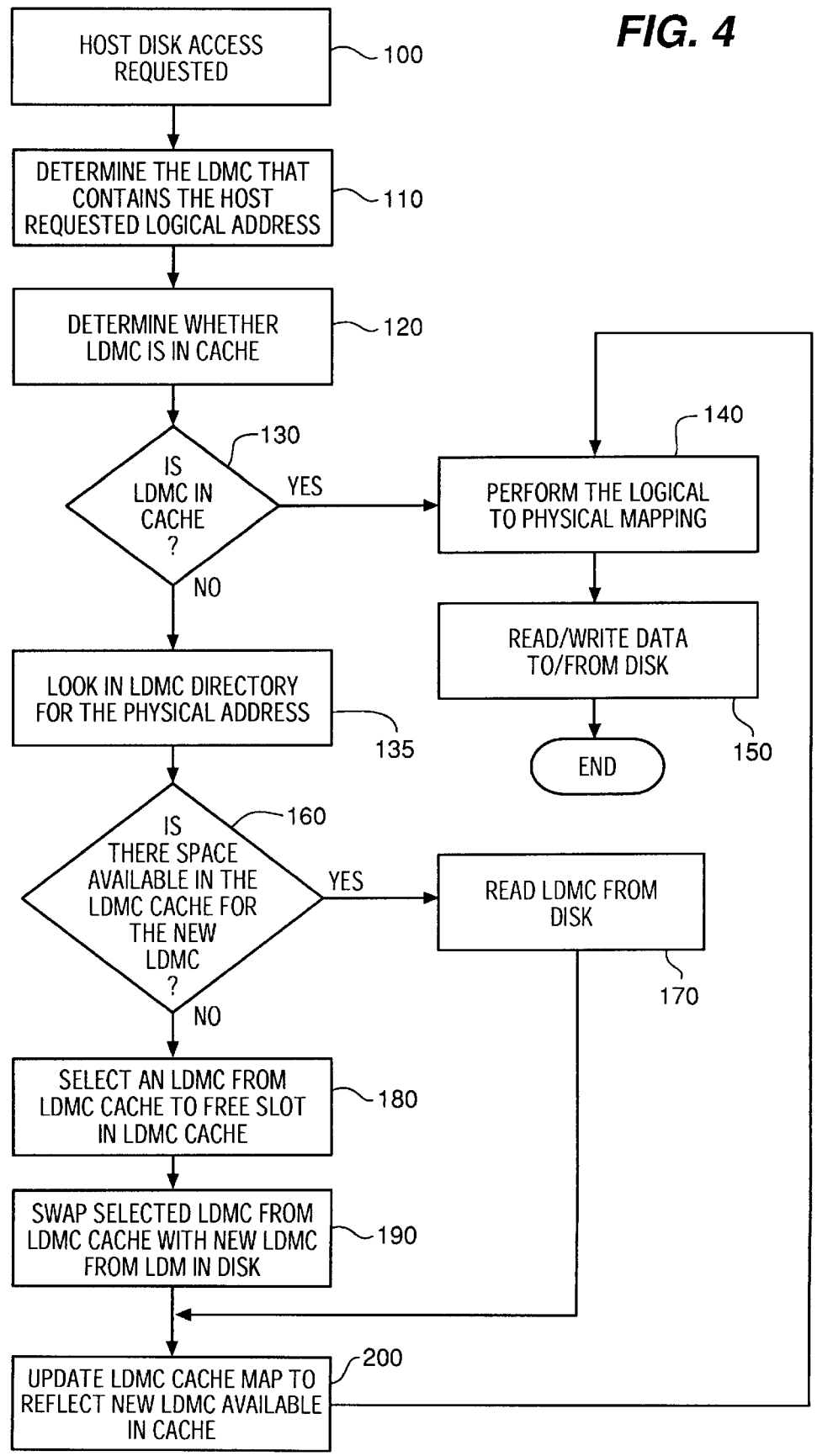
FIG. 4 is a flow diagram of the preferred embodiment.

FIG. 4 is a flow chart depicting the steps required before disk array controller 20 accesses data associated with a logical address requested by a host 100. Before the disk array controller 20 utilizes the logical address received from the host I/O request to retrieve data from disk array 50, the required LDMC # 72 containing the requested logical address from the host I/O request is computed using eq. (1). A person skilled in the art will recognize other possible techniques can be used to determine the LDMC # of the requested logical address.

Once the requested LDMC 60 is identified, the LDMC cache map 80 is scanned 120 to determine if the requested LDMC 60 is present in the LDMC cache 45 or must be retrieved from the LDM 51 stored in disk array 50. If the LDMC 60 is present in cache 130, the logical to physical mapping is performed 140 and the data on the disk array is manipulated in accordance with the host I/O request 150.

If the requested LDMC 60 is not present in the LDMC cache 45, then the physical address of the LDMC must be found within the LDMC directory 135. The LDMC directory 70 contains the physical address associated with the identified LDMC 60. If there is space available 160 in the LDMC cache 45, the requested LDMC 60 is read 170 from disk array 50 into an available LDMC position in the LDMC cache 45. Then the logical to physical mapping is performed 140 and the data on the disk array is manipulated in accordance with the host I/O request 150. Additionally, the LDMC cache map 80 is updated 200.

If no space 160 is presently available in the LDMC cache 45, an LDMC 60 in the LDMC cache 45 is selected 180 and written back, that is, swapped 190 to disk array 50 thereby freeing the associated slot in the LDMC cache 45. After the swap, the LDMC cache map 80 is updated 200. Then the logical to physical mapping is performed 140 and the data on the disk array is manipulated in accordance with the host I/O request 150.

In accordance with the present invention, an unmodified LDMC 60 can be swapped for the required LDMC 60. A read operation does not modify an LDMC 60. If, however, there are no unmodified LDMC 60 whose slot can be reused or disk array controller 20 cache management determines to retain unmodified LDMC in the LDMC cache, then a modified LDMC is flushed to the segment buffer 42. A write operation causes the disk array controller 20 to change the physical address for the particular logical address when posting the modified data blocks.

If a modified LDMC 60 is selected, LDMC 60 is posted to disk array 50 along with other coalesced write requests in the segment buffer 42. Its associated space in the LDMC cache is reused for the required LDMC. The LDMC directory 70 and LDMC cache map 80 are updated.

A person skilled in the art will recognize that a wide variety of replacement policies can be used when managing the LDMC cache 45. Replacement policies are described in UNIX buffer cache algorithms and virtual memory page replacement policies. For example, one replacement algorithm is first-in-first-out (FIFO) which chooses the oldest LDMC 60 to replace. A FIFO buffer can be implemented where each new LDMC is entered at the tail of the queue and swapped to disk when the LDMC reaches the head of the queue. This replacement policy may not be the most optimal if a particular LDMC in the queue just happens to have user data constantly in use. Another replacement algorithm is least recently used (LRU) which chooses the least recently used LDMC 60 to replace. In this case, a counter can be implemented to count each time the LDMC 60 was referenced or a stack can be implemented to place the most used LDMC 60 on the top of the stack. There are other commonly known replacement algorithms such as least frequently used (LFU) or most frequently used (MFU) or hybrids of these previously discussed algorithms. The replacement algorithm chosen will depend on hardware and software design choices that are well known to those skilled in the art to implement FIFOs, stacks or counters. Specific criteria including overhead processing for memory management and the number of swaps that can be tolerated need to be considered in choosing among the replacement algorithms.

To post modified LDMCs 60 to disk array 50, the LDMC blocks are appended to the current segment buffer 42 being written to disk array 50. The physical address of the LDMCs 60 will change because the LDMCs 60 are coalesced within the segment buffer 42. Therefore, the table contained in the SSR 43 must be updated to indicate whether the block is a user data block or an LDMC 60. Similarly, after posting the modified LDMCs 60 to disk array 50, the LDMC directory 70 must be updated to reflect the new physical address of the LDMCs 60.

The new physical address of an LDMC 60 is computed in the following manner. After finding the location of the first available space in the segment buffer 42 (e.g. the space following the last stored block in the segment buffer), the difference between the beginning of the segment buffer 42 and the location of the first available space in the segment buffer is computed. The difference is added to the starting block address of the segment buffer 42 (the physical block address of the segment) to obtain the new physical block address of the LDMC 60. Thus, the LDMC directory 70 reflects the current physical address of the LDMC 60 and disk array controller 20 can scan the LDMC directory to find the current physical address of the LDMC should a read request directly follow the write request.

When a previously written user data block is overwritten, the new data is placed into the segment buffer 42 and the new data is written to another physical address. Thereby requiring the update of the LDMC directory 70 with the new logical to physical address translation of the LDMC. The physical block that previously held the data is now unused and available to store data. To free space within the disk array 50, garbage collection procedures are used to determine which physical block within the disk array 50 can be reused. This operation can be performed as a background task within the disk array controller 20 code.

One method to determine which physical blocks in a log segment 52 can be reused, is to maintain an array of counters, where each counter tracks the number of physical blocks not yet overwritten. Each time a user data block or LDMC 60 is overwritten, the log segment 52 that held the previous version of the physical block will have its counter decremented. The garbage collection procedure scans the log segments 52 to determine which log segment 52 has the most number of counters decremented, and thereby the most garbage. These log segments 52 are marked empty and are made available for reuse. If these identified log segments 52 still have physical blocks that have not been overwritten, the garbage collection procedure reads these blocks into cache and uses the same logic procedures that are operable for writing a user data block and or the LDMC 60 to the disk array 50.

Following a power failure or crash of the volatile cache memory, the LDMC 60 in LDMC cache 45 and the LDMC directory 70 need to be restored because these are in the volatile area of cache memory 40. A person skilled in the art will recognize, the recovery procedure can be part of the procedure used to reset disk array controller 20. Since LDMC cache 45 contains current and possibly modified versions of the LDMCs that were not yet posted to disk array 50, the recovery procedure uses the LDMCs residing in disk array 50 as a starting point.

Periodically, a checkpoint of the area in LDMC cache 45 is performed and stored in nonvolatile memory. Additional information is stored, in nonvolatile memory, regarding the last log segment 52, that is, the log segment that was written prior to the last checkpoint. The algorithm that performs the periodic checkpoint, must post the contents of the segment buffer 42 prior to writing a new copy of the LDMC cache 45 in nonvolatile memory, if the segment buffer 42 contains any LDMCs 60. This ensures the LDMC directory 70 will contain the most current and updated information before the checkpoint is performed.

The reconstruction algorithm initializes the LDMC cache 45 because as data is required it will be demand-loaded by the recovery procedure. The checkpoint image is used as a starting point to recreate the LDMC directory 70. The recovery procedure updates the LDMCs by scanning the log segments 52 in disk array 50 that were updated after the latest checkpoint of the LDMC cache 45. The recovery procedure then determines which log segment 52 was written following the completion of the checkpoint. Starting with this log segment 52, each following log segment 52 is scanned until the end of disk array 50 is reached. For each user data block found in the log segment, the recovery procedure loads the associated LDMC 60 from disk array 50. If the physical address of the LDMC 60 is not the same as the physical address of the user data block, the recovery procedure modifies the LDMC 60 to point to the physical address of the user data block, which is within the current log segment. The modified LDMC 60 is marked as dirty and will be flushed to the segment buffer 42.

For each LDMC 60 entry present in the log segment 52, the LDMC directory 70 is updated to reflect the LDMC 60 entry. The LDMC 60 entry is marked clean because updates made during the recovery procedure have been posted to disk.

The recovery procedure also scans the segment buffer 42 in the same manner that the recovery procedure scans the disk. For each user data block found in the segment buffer 42, the recovery procedure loads the associated LDMC 60 from disk array 50. If the physical address of the LDMC 60 is not the same as the physical address of the user data block, the recovery procedure modifies the LDMC 60 to point to the physical address within the user data block. The modified LDMC 60 is marked as dirty. For each LDMC 60 entry present in the segment buffer, the LDMC directory 70 is updated to reflect the LDMC 60 entry. Thus after the recovery procedure is completed, the LDMC cache 45 will appear to the host as it appeared before the cache memory 40 failed.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

what is claimed is:

1. A method for translating a logical address to a corresponding physical address in a virtually mapped disk storage subsystem wherein said disk storage subsystem includes a plurality of storage devices and a storage controller with a local memory, said method comprising the steps of:

providing a first directory having a plurality of map entries, wherein said first directory is stored on disk drives of said disk storage subsystem and wherein said plurality of map entries identifies a physical address on said plurality of storage devices corresponding to a logical address;

partitioning said plurality of map entries into a plurality of chunks each comprising a subset of said plurality of map entries;

providing a second directory, within said disk storage subsystem, having map entries for said plurality of chunks wherein said second directory identifies a present physical address on said plurality of storage devices for a corresponding chunk of said plurality of chunks;

determining the identity of a first chunk containing the map entry corresponding to a particular logical address;

searching said second directory for said first chunk to obtain the present physical address of said first chunk within said plurality of storage devices;

retrieving said first chunk; and translating said particular logical address into said corresponding physical address in accordance with said map entry for said logical address in said first chunk.

2. The method of claim 1 wherein the step of retrieving comprises the steps of:
   determining that said first chunk is within said local memory; and
   retrieving said first chunk from said local memory in response to the determination that said first chunk is within said local memory.

3. The method of claim 1 wherein the step of retrieving comprises the step of:
   retrieving said first chunk from at least one of said plurality of storage devices.

4. The method of claim 3 wherein the step of retrieving further comprises the step of:
   determining that said first chunk is not within said local memory,
   wherein the step of retrieving said first chunk from at least one of said plurality of storage devices is responsive to said determination that said first chunk is not within said local memory.

5. The method of claim 3 further comprising the step of:
   determining, in response to determining said first chunk is not within said local memory, that space is available in said local memory to store said first chunk into said local memory from said plurality of storage devices.

6. The method of claim 4 further comprising the steps of:
   determining that no space is available in said local memory for said first chunk;
   selecting a second chunk from said local memory in response to determining no space is available in said local memory for said first chunk; and
   swapping said second chunk from said local memory with said first chunk from said at least one storage device.

7. The method of claim 6 further comprising the steps of:
   updating a map within said local memory to keep track of at least one chunk resident in said local memory; and
   updating said second directory to keep track of the physical address of said chunks within said plurality of storage devices.

8. The method of claim 6 further comprising the step of:
   updating said second directory to keep track of said chunks within said local memory and to keep track of the physical address of said chunks within said plurality of storage devices.

9. The method of claim 1 further comprising the steps of:
   periodically creating an checkpoint image of said second directory; and
   storing identification information, within said disk storage subsystem, regarding a chunk most recently stored to said plurality of storage devices.

10. The method of claim 9 wherein in response to a failure of said local memory, a recovery procedure is operable to rebuild the contents of said second directory, said method comprising the steps of:
    initializing said second directory using said image of said second directory;
    scanning said plurality of storage devices;
    updating said second directory by comparing physical addresses in said plurality of storage devices to physical addresses within said second directory;
    scanning a segment buffer; and
    updating said second directory by comparing physical addresses from said segment buffer to physical addresses within said second directory.

11. The method of claim 1 wherein said local memory is non-volatile.

12. A method to utilize a hierarchical logical address to physical address map in a virtually mapped disk storage subsystem to translate a host requested logical address, said disk storage subsystem comprises a plurality of disk drives and a storage controller with a local memory, said method comprising the steps of:
    providing a first directory having a plurality of map entries, wherein said first directory is stored on disk drives of said disk storage subsystem and wherein each of said plurality of map entries identifies a physical address on said plurality of disk drives corresponding to a logical address;
    partitioning said plurality of map entries into a plurality of chunks comprising a subset of said plurality of map entries;
    determining the identity of a first chunk containing the map entry corresponding to said host requested logical address;
    retrieving said first chunk; and
    translating said particular logical address into said corresponding physical address in accordance with said map entry for said logical address in said first chunk.

13. The method of claim 12 wherein the step of retrieving comprises the steps of:
    determining that said first chunk is within said local memory;
    searching a second directory stored in said disk storage subsystem for said first chunk to obtain the present physical address of said first chunk within said plurality of disk drives; wherein said second directory includes map entries for said plurality of chunks to identify a physical address for said plurality of chunks; and
    retrieving said first chunk from said local memory in response to said determination that said first chunk is within said local memory.

14. The method of claim 12 wherein the step of retrieving comprises the steps of:
    determining that said first chunk is not within said local memory;
    searching a second directory stored in said disk storage subsystem for said first chunk to obtain the present physical address of said first chunk within said plurality of disk drives; wherein said second directory includes map entries for said plurality of chunks to identify a physical address for said plurality of chunks; and
    retrieving said first chunk from at least one of said plurality of disk drives in response to determining said first chunk is not within said local memory.

15. The method of claim 14 further comprising the step of:
    determining that space is available in said local memory to store said first chunk into said local memory from said plurality of disk drives.

16. The method of claim 14 further comprising the steps of:
    determining that no space is available in said local memory to store said first chunk into said local memory;
    selecting a second chunk from said local memory in response to determining no space is available in said local memory for said first chunk; and
    swapping said second chunk from local memory with said first chunk from said at least one disk drive.

17. The method of claim 16 further comprising the steps of:

updating a map within said local memory operable to keep track of at least one chunk resident in said local memory; and updating said second directory to keep track of the physical address of said chunks within said plurality of disk drives.

18. The method of claim 16 further comprising the step of:

updating said second directory to keep track of said chunks within said local memory and to keep track of the physical address of said chunks within said plurality of disk drives.

19. The method of claim 12 wherein said local memory is non-volatile.

20. An apparatus for translating a logical address to a corresponding physical address in a virtually mapped disk storage subsystem wherein said disk storage subsystem includes a plurality of storage devices and a storage controller with a local memory, said apparatus comprising:

a first directory having a plurality of map entries, wherein said first directory is stored on disk drives of said disk storage subsystem and wherein said plurality of map entries identifies a physical address on said plurality of storage devices corresponding to a logical address;

a plurality of chunks each comprising a subset of said plurality of map entries;

a second directory, within said disk storage subsystem, having map entries for said plurality of chunks, wherein said second directory identifies a present physical address on said plurality of storage devices for a corresponding chunk of said plurality of chunks;

means for retrieving a first chunk, from said plurality of chunks, containing the map entry corresponding to a particular logical address; and means for translating said particular logical address into said corresponding physical address in accordance with said map entry for said logical address in said first chunk.

21. The apparatus of claim 20 wherein said means for retrieving comprises:

a map within said local memory to keep track of at least one chunk resident in said local memory;

means for searching said map to determine whether said first chunk is within said local memory; and means for retrieving said first chunk from said local memory in response to the determination that said first chunk is within local memory.

22. The apparatus of claim 20 wherein said means for retrieving comprises:

a map within said local memory to keep track of at least one chunk resident in said local memory;

means for searching said map to determine whether said first chunk is within said local memory; and means for retrieving said first chunk from at least one plurality of storage devices in response to the determination that said first chunk is not within local memory.

23. The apparatus of claim 20 wherein said local memory is non-volatile.

* * * * *